May 27, 1924.

R. C. FISHER

AUTOMOBILE SIGNAL

Filed May 4, 1923

1,495,899

Inventor
Richard C. Fisher
By Richard R. Owen
Attorney

Patented May 27, 1924.

1,495,899

UNITED STATES PATENT OFFICE.

RICHARD C. FISHER, OF SACRED HEART, MINNESOTA.

AUTOMOBILE SIGNAL.

Application filed May 4, 1923. Serial No. 636,627.

*To all whom it may concern:*

Be it known that I, RICHARD C. FISHER, a citizen of the United States, residing at Sacred Heart, in the county of Renville and State of Minnesota, have invented certain new and useful Improvements in an Automobile Signal, of which the following is a specification.

This invention relates to indicators or signals and the primary object of the invention is to provide an improved device automatically operated for indicating in which direction a motor vehicle is going to turn, whereby following vehicles can take the necessary precautions and thereby effectively eliminate accidents due to such changing of the course of a vehicle.

Another prime object of the invention is to provide an improved direction signal for automobiles embodying an indicating or signal disk, and novel means for automatically operating said disk upon the turning of the steering wheel of the vehicle.

A further prime object of the invention is to provide an improved direction signal or indicator for motor vehicles embodying a casing having a sight slot therein, a signal disk or wheel rotatably mounted within the housing having indicating matter written thereon, such as "Right" "Left," and the like, an operating wheel engaging the signal wheel or disk and improved means connected with the operating wheel and actuated by the steering mechanism of the vehicle, whereby upon turning movement of the steering wheel, the signal disk or wheel will be turned to bring the words "Right" or "Left" into registration with the sight slot in the housing according to the direction in which the steering wheel is turned.

A still further object of the invention is to provide an improved direction indicator for motor vehicles of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:

Referring to the drawing in detail, wherein similar reference characters designate corresponding parts throughout the several views, the letter A indicates a motor vehicle and B the improved direction signal which can be incorporated therewith.

Figure 1:
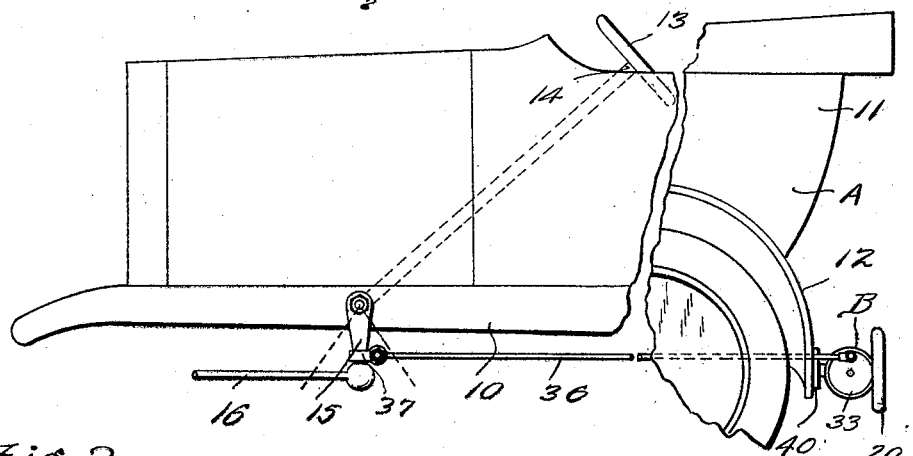
Figure 1 is a fragmentary side elevation of a motor vehicle showing the improved direction signal incorporated therewith.
Figure 2:
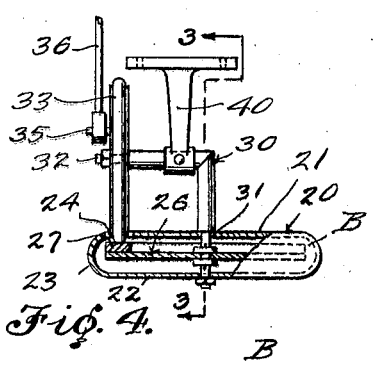
Figure 2 is a top plan view of the direction signal showing parts thereof in section.
Figure 3:
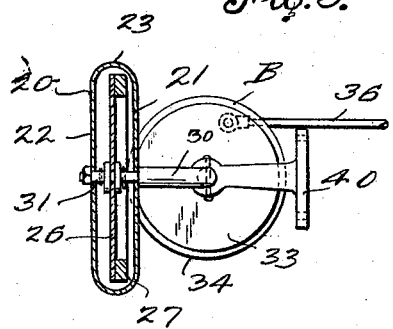
Figure 3 is a vertical section through the improved direction signal taken on the line 3—3 of Figure 2.
Figure 4:
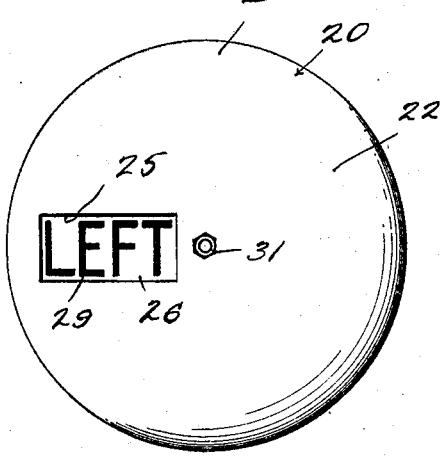
Figure 4 is an enlarged elevation of the housing of the signal showing the indicating disk or wheel moved to a signalling position.
Figure 5:
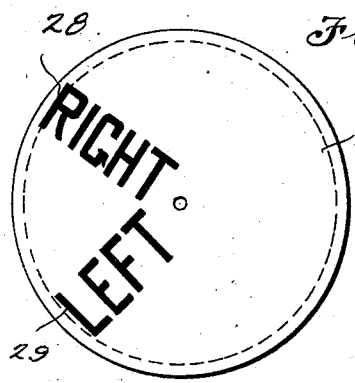
Figure 5 is a detail elevation of the signal disk or wheel.

The vehicle A can of course be of any preferred make or type and as shown embodies the chassis 10, the body 11 including the rear fender 12, the steering wheel and post 13 and 14 and the steering knuckle and draf link 15 and 16.

The improved direction signal B comprises a casing 20 which can be formed of any desired material such as hard rubber, sheet metal or the like and preferably includes the inner and outer disk-shaped walls 21 and 22 and the annular connecting wall 23. The inner wall 21 is provided with a slot 24, for a purpose, which will be hereinafter more fully described, while the outer wall 22 is provided with a radially extending sight slot 25 through which is adapted to appear indicating matter as will be hereinafter more fully described.

Rotatably mounted in the housing 20 is the signal disk or wheel 26. The inner face of the disk 26 is provided with an annular friction track 27 which can be formed of rubber if so desired. The outer face of the signal or indicating disk 26 has printed or otherwise affixed thereon the words "Right" and "Left" as indicated respectively by the reference characters 28 and 29, and it can be seen that these words "Right" and "Left" extend radially to the axial center of the disk and are disposed at substantial right angles to one another. Now any preferred means can be utilized for rotatably holding the disk or signal wheel 26 within the casing 20, and I preferably use an angle-shaped bracket 30 having one arm thereof provided with a stub shaft 21 which is adapted to extend axially through the housing and rotatably support the said signal wheel or disk. The opposite arm of the angle bracket 30 is also provided with a stub shaft 32 on which is rotatably mounted the operating disk 33. This operating disk 33 is disposed at right angles to the signal disk or wheel 26 and is held in any preferred manner on the stub shaft 32 against longitudinal shifting movement thereon and its periphery is preferably provided with a tire 34. This wheel extends into the housing 20 through the slot 24 and is adapted to engage the friction track 27.

While the operating disk or wheel 33 can be actuated in any preferred manner, it is one of the prime objects of my invention to provide novel means for permitting the actuation thereof by the steering mechanism of a motor vehicle with which it is associated, and in order to carry out this end the operating wheel or disk 33 is provided with a crank pin 35 to which is connected the operating link or pitman rod 36. This rod 36 has pivotally connected thereto a suitable clamp 37 which connects the link or pitman rod 36 with the steering arm or knuckle 15. In Figure 1 of the drawing I have shown by dotted lines the position of the steering knuckle or draf-link 15 when the vehicle is turned to "Right" and "Left" and thus it is obvious that when this arm is actuated, that the operating wheel 33 will be turned through a partial revolution.

Any preferred means can be utilized for connecting the improved direction signal B to a motor vehicle and the same can be connected to any part thereof. As shown however, in Figure 1 of the drawing, I provide a bracket 40 for connecting the same to one rear fender 12 of the body 11 of the vehicle A and this bracket 40 is connected to one arm of the angle bracket 30.

In use of the improved direction indicator, when the vehicle is being turned to the left, the steering arm or knuckle 15 will be swung forwardly to a position shown in dotted lines in Figure 1, which will move the pitman rod or link 36 forwardly and consequently rotate the operating wheel or disk 33 which will in turn impart movement to the signal disk or wheel 26 and bring the word "Left" into registration with the sight opening 25 in the casing 20. When the vehicle is being turned to the right, the steering knuckle will be swung to a rear position as shown in dotted lines in Figure 1 of the drawing and thus push rearwardly on the pitman rod or link 36 and rotate the operating wheel 33 in a clockwise direction and impart rotation to the signal disk or wheel 26 in a counter-clockwise direction and bring the word "Right" into alignment with the sight slot 25. This will of course indicate to persons and vehicles in the rear thereof that the vehicle is going to change its course.

Changes in details may be made without departing from the spirit or the scope of this invention.

What I claim as new is:—

1. The combination with a motor vehicle including a steering mechanism having a swinging steering arm, of a direction signal embodying a rigid casing having a sight slot therein, a rotatable signal wheel having different directional indicia thereon, an operating member for the signal wheel and means operatively connecting the operating member with the swinging steering arm.

2. A direction signal for motor vehicles comprising a rigid casing having a sight slot therein, a rotatable signal disk mounted within the casing having different directional matter thereon, a rotatable friction wheel engaging said signal disk, a crank pin connected to the friction wheel, and an operating rod operatively connected to said crank pin.

3. A direction signal comprising a casing having a sight slot therein, a signal wheel rotatably mounted within the casing having different directional indicating matter thereon, a friction track on said signal wheel, an angle bracket having one arm extended into the casing and supporting the signal wheel, a friction disk rotatably mounted upon the other arm of the angle bracket and engaging the friction track on the signal wheel, and means for operating the friction wheel.

In testimony whereof I affix my signature in presence of two witnesses.

RICHARD C. FISHER.

Witnesses:
K. L. JOHNSON,
C. H. FISHER.